United States Patent
Jackson

[11] 3,880,458
[45] Apr. 29, 1975

[54] CAMPER MODULE

[76] Inventor: Gene F. Jackson, 5924 Arlene Ave., Fort Wayne, Ind. 46806

[22] Filed: Mar. 29, 1974

[21] Appl. No.: 456,306

[52] U.S. Cl. .............. 296/23 G; 296/37 R; 5/3; 297/63
[51] Int. Cl. .............................................. B60p 3/32
[58] Field of Search ........... 296/23 MC, 23 R, 23 G, 296/37 R, 24 R; 5/3, 59 B, 58; 297/63, 67

[56] References Cited
UNITED STATES PATENTS

| | | | |
|---|---|---|---|
| 3,556,581 | 1/1971 | Da Silva | 296/23 G |
| 3,636,892 | 1/1972 | Linton | 5/3 |
| 3,738,699 | 6/1973 | Fain | 296/23 R |

*Primary Examiner*—Robert R. Song

[57] ABSTRACT

A removable and foldable camper module is provided which converts a utility vehicle, such as a pickup truck with a top, into a recreational vehicle. The camper module includes bench type seats attached by hinges to opposite sides of a deck plate, and a table top between the benches which can be lowered to the height of the benches. When the table top is lowered, it cooperates with the benches and with cushions on the benches to provide a bed.

For handling and storage, the bench units fold over the deck plate to form a compact rectangular package.

8 Claims, 6 Drawing Figures

3,880,458

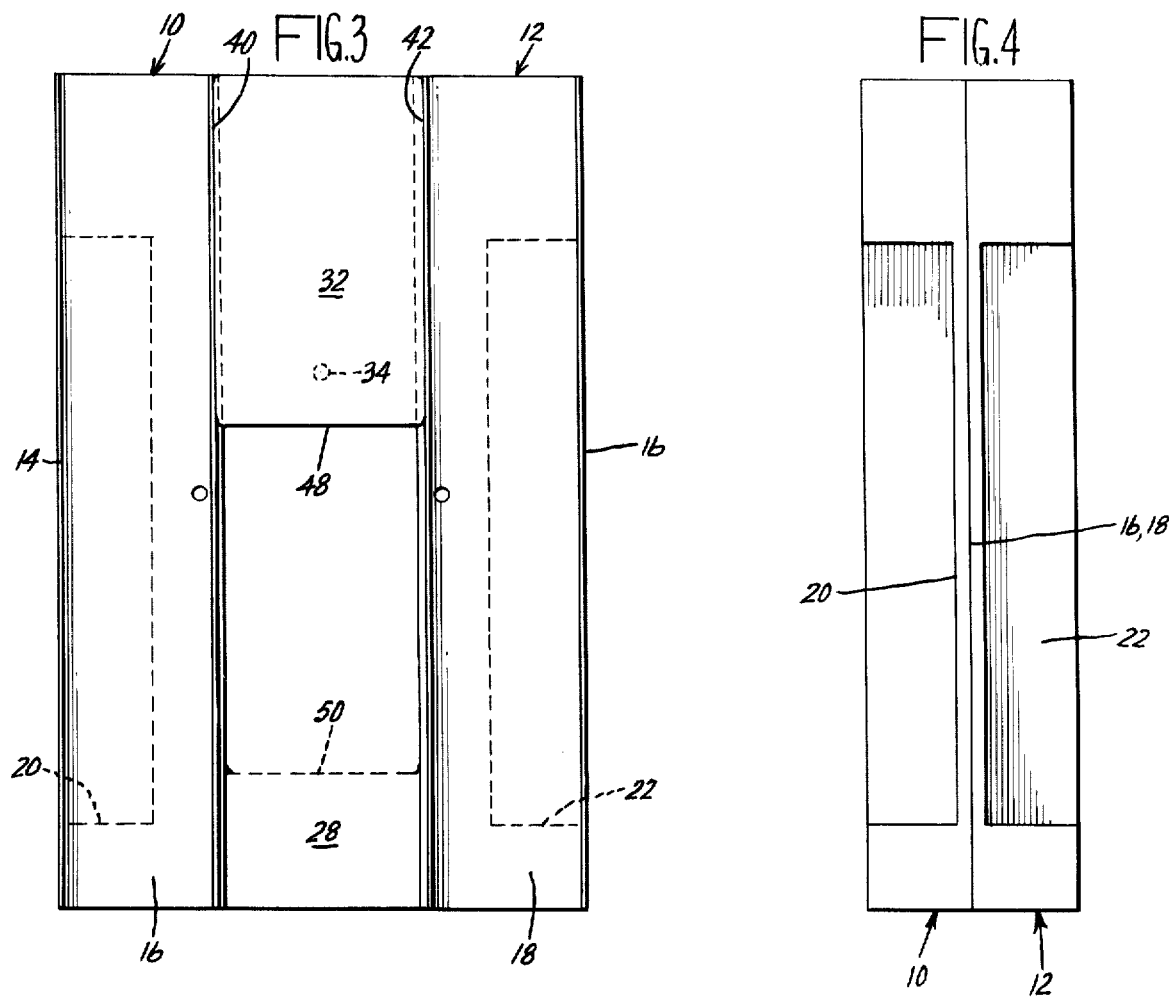
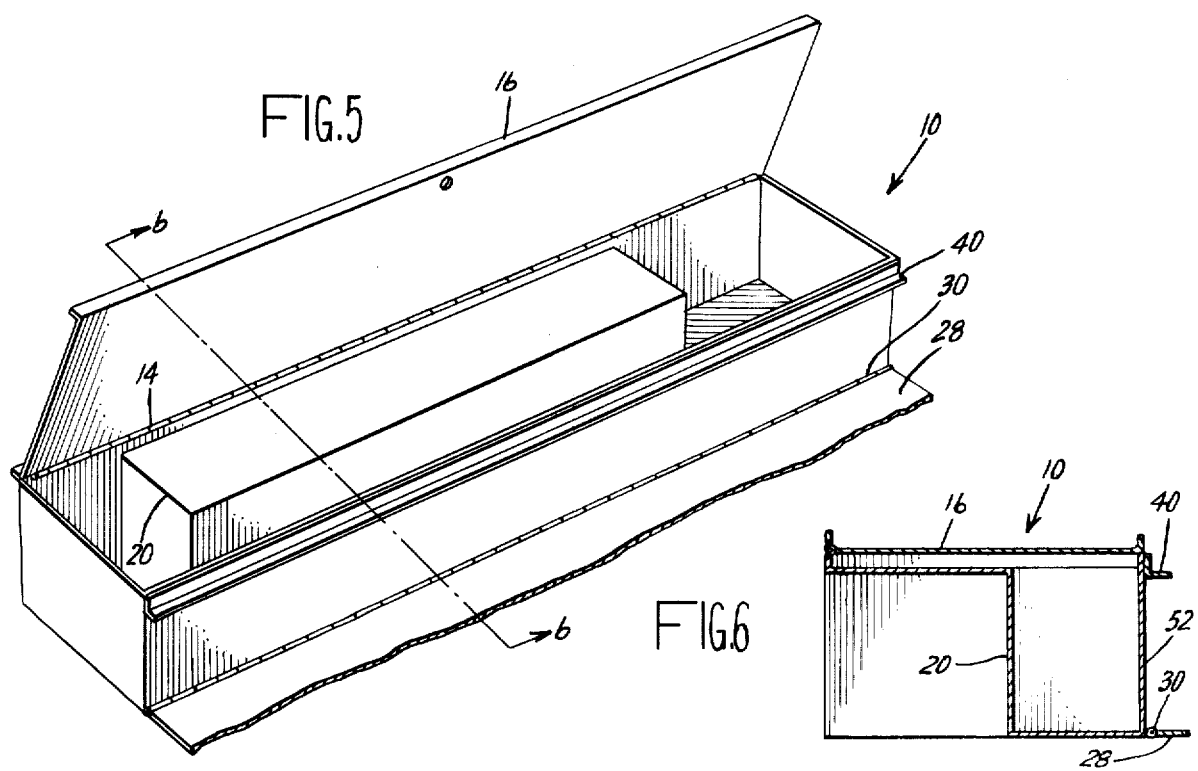

3,880,458

CAMPER MODULE

BACKGROUND OF THE INVENTION

1. Field of the Invention

This invention relates generally to a portable camper module for installation in a utility vehicle such as a pickup truck, and more particularly to a camper module which is convertible into each of a plurality of different configurations, one of these being folded for storage and handling, another being as a bed and a third being as bench seats.

2. Description of the Prior Art

Pickup trucks have, in recent years, been converted into campers by the installation of removable caps onto the truck bed and providing the interior thereof with items of furniture, such as chairs, benches, tables, storage cabinets and the like. In the usual instance, such items of furniture are individually installed as separate pieces and in others are permanently installed.

SUMMARY OF THE INVENTION

In accordance with the broader aspects of this invention, there is provided a portable camper module which is selectively convertible into each of a plurality of different configurations, one of these being a folded compact package for convenient storage and handling, a second being a bed and a third being bench seats. Two rectangular box-shaped benches, in the bench configuration, are disposed in spaced-apart parallel relation when rested on a horizontal supporting surface. A flat deck plate disposed substantially parallel to said supporting surface, which may be the floor of the bed of a pickup truck, has opposite parallel edges hingedly connected, respectively, to the lower facing corners of the benches. The benches are provided with height dimensions that will permit the folding thereof about said hinge connections toward each other and into engagement with the deck plate thereby converting the benches into a relatively compact assembly for convenient storage and handling.

In another embodiment of this invention, a rectangular board of suitable material may be selectively utilized alternatively as either a table top or as a filler support between the benches for supporting mattress cushions. In the latter configuration, the invention becomes a bed.

It is an object of this invention to provide a portable camper module which is convertible into a plurality of different utilitarian configurations.

It is another object of this invention to provide a portable camper module which includes two benches hingedly connected in parallel spaced relation to a deck plate in such a manner that the benches may be folded inwardly onto the deck plate into a configurations for storage and handling or may be unfolded to position the benches for sitting and reclining.

It is yet another object of this invention to provide a filler member which may be removably installed on the benches to provide a mattress-supporting surface or may be converted into a table top positioned above and between the benches.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWING

In the drawings:

FIG. 3 is a top plan view of the bench and table combination of FIG. 1 but with the parts of the truck omitted;

FIG. 4 illustrates the bench units of the preceding figures folded into storage configuration;

FIG. 5 is a perspective illustration of one of the bench units with the hinged seat or cover portion swung to expose the interior;

FIG. 6 is a cross-section taken substantially along section line 6—6 of FIG. 5.

DESCRIPTION OF THE PREFERRED EMBODIMENT

Figure 1:
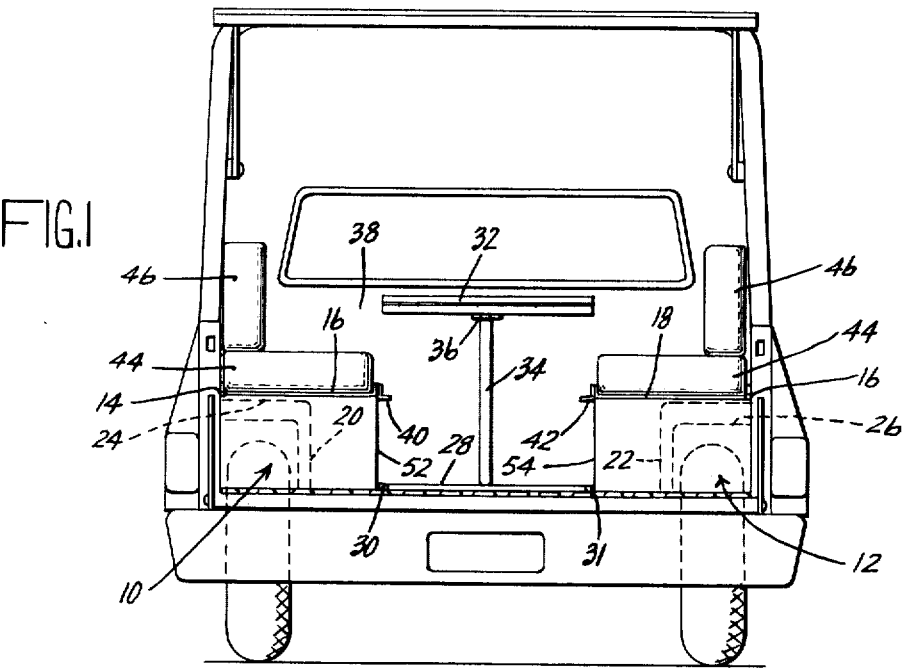
FIG. 1 is a rear view of a pick-up truck having a camper top installed thereon and with a module of this invention positioned therein for utilization as benches in combination with a table top.
Figure 2:
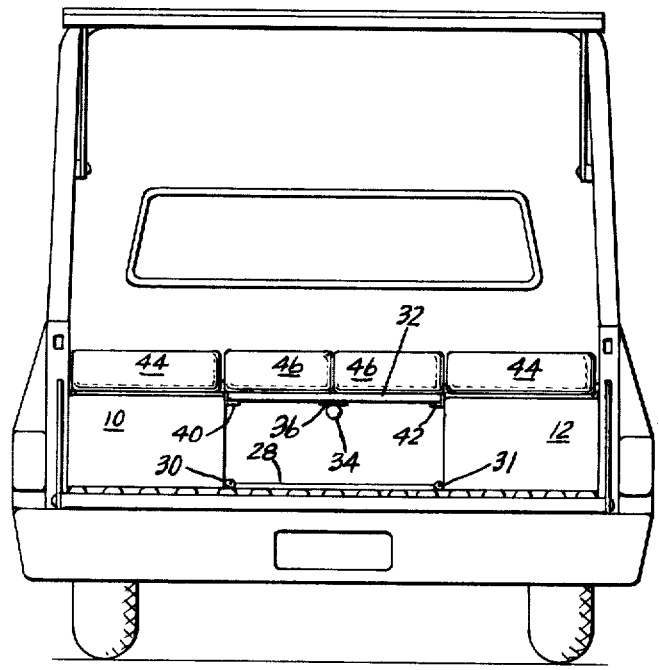
FIG. 2 is a similar view with the table top lowered into position between the benches to provide a supporting surface for mattress cushions.

Referring to the drawings, the camper module of this invention is shown in its folded configuration for storage in FIG. 4, but expanded for seating use in FIGS. 1 and 3 and converted for utilization as a bed in FIG. 2. Referring primarily to FIGS. 1 and 3, the camper module includes two rectangular, shell-like benches generally indicated by the reference numerals 10 and 12 which are rectangular in shape, spaced-apart and parallel. These benches may be fabricated of either sheet metal or plywood, and one is shown more clearly in FIGS. 5 and 6. They have hollow interiors for storage. The top sides of the benches serve as seats 16 and 18, respectively. These seats are hinged along the rear edges to the upper outer corners of the benches at 14 and 16, respectively. The lower outer corner portions, as viewed in FIGS. 1 and 2, are provided with rectangular recesses 20 adapted to fit over the wheel wells 24 and 26, respectively, in the bed of the usual pickup truck as shown in FIG. 1.

To the bottom, inside corners, as viewed in FIGS. 1 and 2, of the benches is attached a rigid sheet of material 28, which may be either of metal, plywood, composition board or the like, hereinafter referred to as a deck plate 28, by means of hinges 30 and 32 which extend for the full lengths of the benches 14 and 16 and the deck plate 28.

The structure thus far described is shown unfolded in FIG. 3 thereby to provide bench seats as shown in FIG. 1. The deck plate 28 lies flat on the floor of the truck bed as shown.

Situated between the two benches 10 and 12 of FIG. 1 is a table composed of a top 32 supported from the deck plate 28 by means of a pedestal or leg 34 hingedly connected to the top 32 at 36 for swinging movement into engagement with the under side of the top 32 in parallelism with the longitudinal dimensions of the benches 10 and 12. The forward edge of the top 32 extends forward to the vicinity of the ends of the two benches 10 and 12 as shown in FIG. 3 where it attaches to suitable brackets (not shown) on the wall 38 of the truck cab. Thus, the table top 32 is supported at its forward edge as well as by the pedestal 34 in centered position between the two benches 10 and 12.

The table top 32 may be removed from its position as shown in FIG. 1 and reinstalled as shown in FIG. 2 to convert the benches 10 and 12 to a bed type support. This is accomplished by swinging the pedestal 34 rearwardly until it engages the under side of the top 32 (as shown in FIG. 2) where the pedestal is retained in a conventional U-shaped spring clamp 37 secured to the under side. The top 32 is then detached from its mounting on the cab wall 38 and lowered to the position shown in FIG. 2 where it fits between the two benches 10 and 12 to rest flush with the top surfaces thereof. Two elongated angle brackets 40 and 42 are secured along with the front edges of the two benches 10 and 12, respectively, adjacent to the upper surfaces such that they will retain the top 32 flush with the upper surfaces of the two benches 10 and 12 when the top 32 is rested on the brackets 40 and 32. The table top 32 is sized to just fit between the two benches as shown.

Conventional cushions 44 and 46 for the seats and back rests are laid flat on the benches and table top 32 in the position shown in FIG. 2 for providing a mattress cushion for a bed.

Referring to FIG. 3, the table top 32 preferably is made into two congruent overlapped sections hinged along the end edge 48. When converting the table top from elevated to lowered position, the two sections are unfolded so that the space from the cab end of the benches to the dashed line 50 will be filled (as shown in FIG. 2) to provide, for example, a 72 inch bed support. Thus, the table top 32 becomes a filler support between the two benches for forming a bed configuration.

For storage and handling purposes, the benches 10 and 12 are swung inwardly about the hinges 30 and 32 until the front sides 52 and 54 lie flat against the deck plate 28. Thus folded, the benches and the deck plate take the configuration shown in FIG. 4. By making the heights of the front sides 52 and 54 equal to less than one-half the width of the floor plate 28, the seats 16 and 18 will engage to form a line as shown in FIG. 4.

With the benches folded into the compact configuration shown in FIG. 4, handling and storage are facilitated.

When it is desired to install the module, the module as folded is inserted longitudinally into the central portion of the truck bed with the deck plate 28 occupying the same position as shown in FIG. 1. The two benches 10 and 12 are then merely swung outwardly about the hinges 30 and 32, respectively, until they rest on the flat surface of the truck bed with the recesses 24 and 26 covering the respective wheel wells.

Next, the table top 32 with the pedestal 34 extended is installed and the seat cushions 44 and 46 placed in position. The module is now converted to a bench and table set.

As previously explained, the bench and table set is convertible into a bed as shown in FIG. 2. Further than this, the bench set itself is convertible into the folded assembly as shown in FIG. 4 which occupies less space than when in the unfolded condition shown in FIGS. 1 and 2. Since the benches 10 and 12 are for the most part hollow, the available space therein may be used for storage, access thereto being gained by lifting the respective seats 16 and 18.

While there have been described above the principles of this invention in connection with specific apparatus, it is to be clearly understood that this description is made only by way of example and not as a limitation to the scope of the invention.

What is claimed is:

1. A portable camper module which is convertible into each of a plurality of different configurations comprising two rectangular box shaped benches disposed in spaced apart parallel relation when rested on a horizontal supporting surface, a flat deck element disposed substantially parallel to said supporting surface having opposite parallel edges hingedly connected, respectively, to the lower facing portions of said benches, said benches having height dimensions that will permit the folding thereof about said hinge connections toward each other into engagement with said deck element.

2. The module of claim 1 in which said height dimensions are equal substantially to one-half the distance between said deck element edges.

3. The module of claim 2 including a flat supporting member having opposed parallel edges spaced apart a distance corresponding to the spacing between said benches when on said supporting surface, and means removably supporting said flat supporting member in position in registry with the space between said benches.

4. The module of claim 3 in which said means includes two brackets secured in parallelism to the upper facing portions of said benches, the edge portions of said supporting member being engageable with said brackets, respectively.

5. The module of claim 2 in which said benches are each provided with rectangular recesses in the outside lower corner portions thereof adapted to fit over the wheel wells in the bed of a pick-up truck, said recesses being located between the ends of the respective benches.

6. The module of claim 5 in which each bench is provided with a cover hinged along one longitudinal edge which serves as a seat when said benches are rested on said supporting surface, said benches being hollow and thereby providing storage spaces.

7. The module of claim 6 including seat and back rest cushions for each bench, a flat supporting member having opposed parallel edges spaced apart a distance corresponding to the spacing between said benches when on said supporting surfaces, and means removably supporting said flat supporting member in position in registry with the space between said benches, said cushions being so shaped and dimensioned that upon being laid edge to edge on said bench seats and supporting member they may serve as a mattress.

8. The module of claim 7 including an upright tubular post resting on said deck element and positioning said supporting member at table top height.

* * * * *